United States Patent [19]
Hirano et al.

[11] Patent Number: 5,781,210
[45] Date of Patent: Jul. 14, 1998

[54] RECORDING METHOD AND RECORDING SOLUTION

[75] Inventors: Hideki Hirano, Kanagawa; Hiroyuki Shiota, Chiba; Shuji Sato; Kenji Shinozaki, both of Kanagawa, all of Japan

[73] Assignee: Sony Corporation, Tokyo, Japan

[21] Appl. No.: 602,384

[22] Filed: Feb. 16, 1996

[30] Foreign Application Priority Data

Feb. 17, 1995 [JP] Japan ..................... 7-053308

[51] Int. Cl.$^6$ ............... B41J 2/14; B41J 2/32; C09D 11/00
[52] U.S. Cl. ............... 347/51; 347/52; 347/171; 106/31.27; 106/31.49
[58] Field of Search ............... 347/51, 52, 171; 106/31.27, 31.29, 31.57, 31.58, 31.45, 31.47, 31.49

[56] References Cited

U.S. PATENT DOCUMENTS

| | | | |
|---|---|---|---|
| 3,316,294 | 4/1967 | Feighner | 260/505 |
| 4,248,929 | 2/1981 | Morgan et al. | 428/288 |
| 5,172,131 | 12/1992 | Crystal et al. | 346/1.1 |
| 5,561,451 | 10/1996 | Ogata et al. | 347/51 |

*Primary Examiner*—Peter S. Wong
*Assistant Examiner*—Rajnikant B. Patel
*Attorney, Agent, or Firm*—Hill & Simpson

[57] ABSTRACT

A recording method of ink jet system which employs a recording solution composed of a dye which vaporizes more than 90 wt % upon heating at a temperature above 300° C., leaving residues in an amount less than 10 wt %, and a solvent having a boiling point higher than 150° C. which dissolves or disperses the dye more than 5 wt % at a temperature below 50° C., the recording solution being heated at the time of recording by the recording solution heating unit which has a porous structure formed thereon which is composed of fine parts whose dimension in the plane direction is 0.2-3 μm and whose dimension in the direction perpendicular to the plane direction is 2-15 μm. This recording method makes use of the advantage of both the thermal transfer system and the ink jet system. Thus, it realizes a high resolution and a gradation within a picture element, produces high-quality images promptly, permits the printer to be made small and light, involves no waste materials, permits printing on plain paper, and needs a less amount of power and running cost.

20 Claims, 13 Drawing Sheets

FIG.4
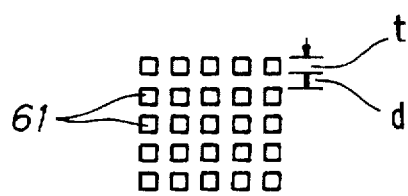
Column-type structure
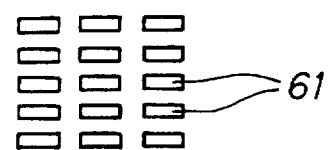
Plate-type structure
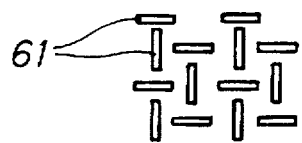
Maze-type structure
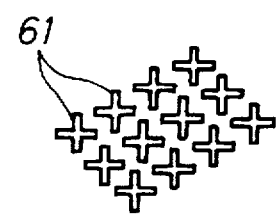
Cross-type structure 5,781,210

1

RECORDING METHOD AND RECORDING SOLUTION

BACKGROUND OF THE INVENTION

1. Field of the Invention

The present invention relates to a recording method and a recording solution therefor. More particularly, the present invention relates to a full-color image recording method which consists of transferring ink droplets to the printing paper from a recording head which produces ink droplets as it is selectively heated according to the image information.

2. Description of the Related Art

Conventional monochrome video cameras and computer graphics are being replaced by full-color ones, and this movement has created an active demand for color copies. To meet this demand, there have been proposed several color-recording methods, such as sublimate thermal transfer printing, melt thermal transfer printing, ink jet printing, electrophotographic printing, and heat development of silver salt. Of these methods, the first and third ones are known to readily produce high-quality images with a simple apparatus.

The sublimate (or dye diffusion) thermal transfer printing method employs an ink ribbon or ink sheet coated with an ink layer composed of a binder resin and a transfer dye dispersed therein in high concentrations. To carry out printing, the ink sheet is brought, under a prescribed pressure, into close contact with the printing paper coated with a resin capable of receiving the transferred dye. Then, the ink sheet is heated by a heat-sensitive recording head which is placed on the ink sheet and is given heat according to the image information. Thus the dye is transferred to the paper in proportion to the amount of heat given to the ink layer through the ink sheet. Repeating the above-mentioned process for image signals corresponding to the separated subtractive primaries (yellow, magenta, and cyan) yields a full-color image having a continuous gradation.

The dye-diffusion thermal transfer printing method mentioned above is attracting attention because it yields high-quality images (comparable to silver-salt color photographs) and it can be practiced promptly with a small, easy-to-maintain apparatus.

FIG. 17 is a schematic front view showing an important part of the thermal transfer printer. There are shown a thermal head 1 (or heat-sensitive recording head) and a platen roll 3, which are opposite to each other. There are shown an ink sheet 12 and recording paper 20, which are held between the thermal head 1 and the platen roll 3. The ink sheet 12 is composed of a base film 12b and an ink layer 12a formed thereon. The recording paper 20 is composed of base paper 20b and a dye-receiving resin layer 20a formed thereon. The ink sheet 12 and the recording paper 20 are pressed against the thermal head 1 by the platen roll 3 which rotates.

The thermal head 1 selectively heats the ink layer 12a. The heated ink (transferable dye) is transferred to the recording paper 20, so that a dot pattern is formed on the dye-receiving resin layer 20a. In this way thermal transfer recording is accomplished. The thermal head may be moved (scanned) back and forth in the direction perpendicular to the moving direction of the recording paper 20. Alternatively, the thermal head may be stationary and elongated across the width of the recording paper. The former system is referred to as "serial type" and the latter, "line type".

2

The above-mentioned thermal transfer system suffers the disadvantage of involving a large amount of waste of the throwaway ink sheet, which leads to high running costs and hinders its widespread use.

Thus, the conventional thermal transfer printing system only produces the high-quality images at the expense of high running costs due to specialized printing paper and throwaway ink ribbon or sheet.

By the same token, the heat-development silver salt system for high-quality images suffers high running costs (and needs an expensive equipment) due to specialized printing paper and throwaway ink ribbon or sheet.

In contrast, the ink jet system involves no waste materials and hence enjoys low running costs. It performs recording with ink droplets which are forced to fly from the nozzle of the recording head being actuated according to the image information. There are several ways of generating ink droplets and forcing them to fly, as exemplified by the electrostatic attraction system, continuously vibrating system (or piezo system), and thermal system (bubble jet system). They are disclosed in U.S. Pat. No. 4,723,129 and Japanese Patent Publication No. 217/1993.

Unlike the ink sheet printing, the ink jet printing is almost free of wastes and enjoys low running costs. In addition, the recently developed thermal system, which readily yields color images, is promoting the widespread use of ink jet printing.

However, ink jet printing suffers a disadvantage of being inherently incapable of producing the density gradation within each picture element. Therefore, it hardly reproduces in a short time high-quality images (comparable to silver salt photographs) which can be obtained by the dye diffusion thermal transfer system.

In other words, the conventional ink jet printing is based on the principle that one ink droplet forms one element and hence it is inherently incapable of producing the density gradation within each picture element and forming high-quality images. An attempt has been made to produce the pseudo continuous tone images by the dither method taking advantage of the high resolution of ink jet printing. This attempt, however, has been unsuccessful; the resulting images are inferior to those obtained by the sublimate thermal transfer system, and the transfer rate is extremely slow.

On the other hand, the electrophotographic printing system offers the advantage of low running costs and high transfer rate but suffers the disadvantage of requiring an expensive equipment.

As mentioned above, there have been no recording systems which meet all the requirements for high-quality images, low running costs, inexpensive equipment, and high transfer rate.

SUMMARY OF THE INVENTION

It is an object of the present invention to provide a new recording method and a recording solution to be used for the recording method. The recording method of the present invention utilizes both advantages of the above-mentioned thermal transfer system and ink jet system and yet is free from their disadvantages. It is capable of promptly producing high-quality images with high resolution and continuous tone within each picture element. It needs only a small, light equipment, and it is capable of recording on plain paper, with low electric power consumption at low running costs, without causing wastes.

BRIEF DESCRIPTION OF THE DRAWINGS

FIG. 4 is a plan view showing the pattern of the minute columnar bodies formed in the transfer unit (evaporating unit) of the printer head;

DETAILED DESCRIPTION OF THE INVENTION

Figure 1:
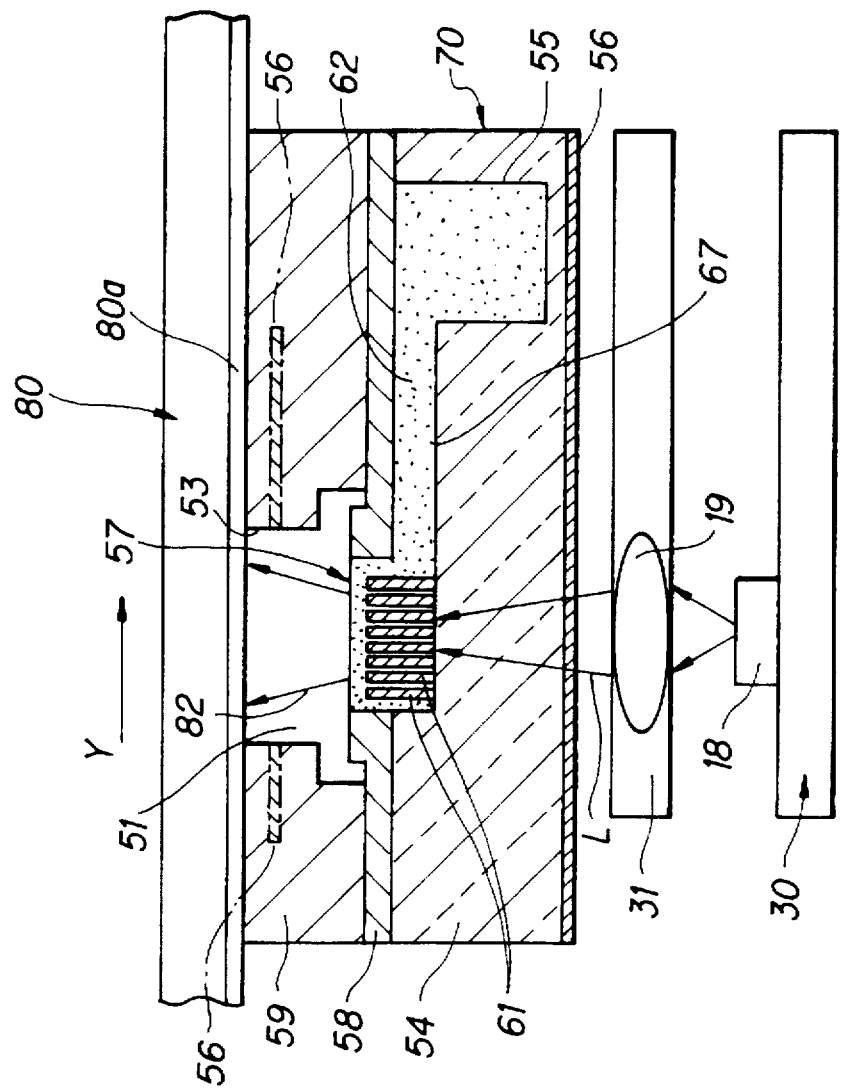
FIG. 1 is a sectional view of the printer head used in the first embodiment of the present invention.

In an attempt to develop a new image forming method, the present inventors carried out extensive studies on the ink jet system to record full-color images with three primary colors, each color image being formed on the opposite printing paper with droplets of recording solution which are discharged from the recording unit upon its selective heating in response to the image information. As the result, it was found that it is possible to produce more than 128 steps of gradation within one picture element (which the conventional ink jet system cannot produce) by using a recording unit or a recording-solution heating unit (designed to heat and discharge the recording solution) which has a rugged structure, typically 0.2–3 µm wide and typically 2–15 µm high. This finding led to the present invention.

The first aspect of the present invention resides in an improved recording method including the steps of feeding a recording solution to a recording solution heating unit, heating the recording solution to change its state, making the recording solution into droplets, and transferring the droplets to a recording medium placed opposite to the recording solution heating unit, the recording solution being composed of a recording material and a substance which dissolves or disperses the recording material therein, characterized in that the recording solution heating unit has a porous structure formed on the front thereof, the porous structure being composed of fine parts whose dimension in the plane direction is 0.2–3 µm and whose dimension in the direction perpendicular to the plane direction is 2–15 µm, and that the recording solution is composed of a dye which vaporizes more than 90 wt % upon heating at a temperature above 300° C., leaving residues in an amount less than 10 wt %, and a solvent having a boiling point higher than 150° C. which dissolves or disperses the dye more than 5 wt % at a temperature below 50° C.

The recording method of the present invention produces the following three marked effects owing to the porous structure (such as a rugged structure made up of a number of columnar bodies) formed on the recording solution heating unit.

(1) The rugged structure forms a large surface area which permits the recording solution to be supplied to the recording unit spontaneously by capillary action.

(2) A liquid generally decreases in surface tension in proportion to temperature. Likewise, the recording solution close to the heat source locally becomes lower in surface tension compared with its surroundings, and the heated recording solution experiences an outward force. However, the above-mentioned rugged structure prevents the heated recording solution from moving outward, thereby preventing the transfer sensitivity from decreasing.

(3) The rugged structure on the recording unit is made up of a number of concave parts which function as the minute discharge ports for the recording solution. Therefore, the recording unit produces extremely fine droplets of the recording solution as many as proportional to the amount of heat applied to the recording unit, and the fine droplets are forced to fly to the recording medium (such as printing paper) placed opposite to the recording head.

The foregoing is the principle of realizing the gradation within each picture element which has never been achieved by the conventional ink jet system.

The recording method of the present invention is characterized by using a heating unit of the above-mentioned porous structure (rugged structure). The porous structure has an increased surface area and permits the recording solution to be supplied to the recording solution heating unit by capillary action at all times. Therefore, the heating unit holds the recording solution therein. As the heating unit is given a prescribed amount of heat according to the recording information by a heating means (such as laser beam), it partly vaporizes the recording solution, resulting in a pressure increase. The pressure makes the recording solution into minute droplets in response to the recording information (or the electric image produced by a color video camera or the like) and forces them to fly to the recording medium, thereby transferring an image to the recording medium.

The droplets thus produced are smaller in size and larger in number as compared with those produced by the conventional ink jet system. Moreover, the number of droplets can be freely controlled in response to the amount of heat supplied to the recording solution heating unit according to the recording information. Thus the recording method of the present invention produces high-quality records (such as full-color images) comparable to or superior to the silver salt images, owing to its capability of multiple density gradation.

Owing to the recording head of special structure capable of transferring minute recording solution droplets on the "on-demand" basis, the ink jet system offered by the present invention produces 128 or more gradations in each picture element at least per color.

What is essential in the recording method of the present invention is the above-mentioned fine porous structure. For the porous structure to fully exhibit its performance, it is necessary that it has a dimension of 0.2–3 µm in the direction of the plane of the heating unit and it also has a dimension of 2–15 µm in the direction perpendicular to the direction of the plane.

The porous structure should preferably be formed with fine columnar bodies, each measuring 0.5–3 µm in side or diameter and 2–10 µm in height, which are arranged in three or more rows and three or more columns at intervals of 0.5–3 µm.

The porous structure mentioned above may be formed by making a 5–20 µm thick film form porous alumina having an average pore diameter of 0.1–2 µm, making a 5–20 µm thick film from glass beads having an average particle diameter of 0.5–3 µm, or growing on a substrate a large number of silicon whiskers having an average diameter of 0.5–2 µm and an average height of 2–10 µm at intervals of 1–3 µm.

However, for the heating unit to be able to accurately control the amount of ink to be transferred, it is necessary that the porous structure be made up of minute columnar bodies which are regularly arranged at intervals of 0.5–3 µm in three or more rows and three or more columns. Such columnar bodies may be formed by reaction ion etching (RIE) or powder beam etching so that they measure 0.5–3 µm in side or diameter and 2–10 µm in height.

In addition, the porous structure should have heat resistance above 300° C. The recording solution heating unit should be positioned such that the droplets of the recording solution are forced to fly to the recording medium opposite to the heating unit with a gap of 10–500 µm between.

The second aspect of the present invention resides in a recording solution which is composed of a dye which vaporizes more than 90 wt % upon heating at a temperature above 300° C., leaving residues in an amount less than 10 wt %, and a solvent (nonaqueous solvent) having a boiling point higher than 150° C. which dissolves or disperses the dye more than 5 wt % at a temperature below 50° C.

According to the present invention, the solvent for the recording solution should be one which completely dissolves or disperses the above-mentioned dye and also has a boiling point higher than 150° C. This high boiling point is necessary because the above-mentioned porous structure has a large surface area which causes the recording solution to evaporate, making the recording unit dry. This causes the recording solution to fluctuate in concentrations, resulting in poor recording.

In particular, this solvent should preferably be one which has a melting point lower than 50° C. and a boiling point ranging from 250° C. to 400° C. With a melting point higher than 50° C., the recording solution, which contains a dye with a melting point higher than 100° C., tends to solidify while the recording unit is idle at room temperature or below 50° C. With a boiling point lower than 250° C., the recording solution permits the solvent to evaporate from the recording unit which is exposed to the atmosphere. With a boiling point higher than 400° C., the recording solution is slow to evaporate, which leads to low sensitivity.

The solvent should preferably be one which has a molecular weight lower than 450. With a molecular weight higher than specified above, the recording solution does not expand sufficiently upon evaporation, which leads to low sensitivity. A preferred solvent is one which leaves residues less than 0.01 wt % when heated at 200° C. in the air.

In addition, the solvent should have the property that it is spontaneously absorbed by fibers constituting art paper or plain paper for PPC. This property is important for transfer to plain paper.

For the solvent to dissolve the above-mentioned dye in an amount more than 5 wt %, especially more than 10 wt %, at 50° C. or below, it should have a solubility parameter in the range of 7.5 to 10.5 at 25° C. (which is defined by J. H. Hildebrand). Moreover, it should have a flash point higher than 150° C., and it should have a low toxicity to human bodies and be colorless. With a solubility parameter in excess of 10.5, the solvent does not readily dissolve the dye but adsorbs moisture from the air, which causes the transfer sensitivity to fluctuate. A solubility parameter lower than 7.5 is undesirable for the dissolving power of the solvent.

Preferred examples of the solvent for the recording solution include aromatic esters including dialbyle phthalate (such as dimethyl phthalate, diethyl phthalate, dibutyl phthalate, diisobutyl phthalate, and dioctyl phthalate) and/or aromatic hydrocarbons (such as n-alkylbenzene, n-alkylnaphthalene, n-dialkylbenzene, and n-dialkylnaphthalene, with the alkyl having 2 to 30 carbons). The alkyl group includes ethyl group, isopropyl group, and dodecyl group. In the case of n-alkylbenzene, the alkyl group should be one which has 10–15 carbon atoms. An example of such n-alkylbenzene is dodecylbenzene.

The dye used for the recording solution of the present invention should preferably be one which is classified as disperse dye or solvent dye in the color index. It may be precisely specified by a solubility parameter ranging from 7.5 to 10.5 at 25° C., a molecular weight lower than 550, and a rate of evaporation greater than $1 \times 10^{-4}$ g/m$^2$ sec (on heating at 200° C. in the air), with non-volatilizable residues less than 0.1 wt %. With a solubility parameter outside the specified range, the dye will not dissolve more than 5 wt % in the above-mentioned solvent.

The recording method according to the present invention achieves the transfer of the dye by two mechanisms. The first one is the discharging of the recording solution which takes place as the solvent evaporates and expands. The second one is the evaporation (by heat) of the dye itself. (The evaporated dye flies and sticks to the printing paper.) Therefore, if the dye has a lower rate of evaporation than specified above, the concentration of the dye in the recording solution increases during transfer until the saturation point is reached. In this situation the solid dye separates out, causing the clogging of the rugged structure. This trouble will also occur if the dye is poor in heat resistance or contains a large amount of non-volatile impurities which remain as residues (more than 0.1 wt %) on heating at 200° C. in the air.

The above-mentioned disperse dye should preferably be one which is incorporated with a dispersing agent. Such a disperse dye may be selected from ESC dye series (from Sumitomo Chemical Co., Ltd.).

Examples of the disperse dye include azo dyes (such as CI (color index) disperse yellow 3, disperse yellow 7, disperse yellow 8, disperse red 1, disperse red 17, and disperse red 19), quinophthalone dyes (such as disperse yellow 54), and anthraquinone dyes (such as disperse red 4, disperse red 11, disperse red 60, disperse blue 14, and disperse blue 26).

Examples of the solvent dye include Kayaset dye series (from Nihon Kayaku), Daiamira dye series (from Mitsubishi Kasei), Mitsui dye series (from Mitsui-Toatsu), Sumiplast dye series (Sumitomo Chemical), and Aizen dye series (from Hodogaya Kagaku).

Preferred examples of the solvent dye include azo dyes (such as solvent yellow 8, solvent yellow 16, solvent yellow 56, solvent red 19, solvent red 23), and quinophthalone dyes (such as solvent blue 35).

Other dyes that can be used in the present invention include dicyanostyryl dyes, tricyanostyryl dyes, and indocyanin dyes.

The above-mentioned disperse dye or solvent dye should preferably be purified by sublimation or the like prior to use so that it does not leave more than 0.1 wt % of residues when heated at 200° C. in the air.

The recording solution should be prepared by dissolving in the above-mentioned solvent at temperatures lower than 50° C. the above-mentioned dye in an amount of 5 wt % or above, preferably 10 wt % or above, more preferably 20 wt % or above. It may be possible to use two or more dyes or to use two or more solvents in order to increase the solubility. The recording solution should preferably have a surface tension greater than 15 mN/m at 25° C., so that it can be efficiently fed to the recording unit by capillary action.

A preferred recording solution of the present invention may be prepared from a dialkyl phthalate and/or n-alkylbenzene as the solvent and a disperse dye and/or solvent dye (both hydrophobic) as the dye.

The conventional ink jet system usually employs an acid dye, which is hydrophilic and hence is poor in water resistance. In addition, an acid dye tends to flow on the recording paper, does not develop color easily, and is subject to thermal decomposition (which is called "kogation") at the time of recording. By contrast, the above-mentioned disperse dye and solvent dye are free from such disadvantages; they readily stick to the recording and develop color completely.

In addition, the dialkyl phthalate and/or n-alkylbenzene as the solvent permits the disperse dye or solvent dye to penetrate into the recording paper and helps them to develop color. In other words, these solvents function as the color developing auxiliary. This is the reason why the recording solution of present invention can be transferred to PPC paper for high-quality images. Unlike the conventional recording solution containing the dye in concentration of 5 wt % at highest, the recording solution of the present invention may contain the dye in concentration higher than 10 wt % because it permits the amount of the solvent to vary over a broad range of 50 to 98 wt %. The higher the dye concentration, the higher the image density.

The recording method of the present invention employs the transfer head which is made up of a recording unit provided with a heating means, an ink reservoir to store the recording solution, and a recording solution passage to connect the recording unit and the ink reservoir. The transfer head can be heated up to 50° C. so that the recording solution has an adequate viscosity. For reduction of transfer time, one recording head may be provided with two or more recording units. The recording solution is continuously fed to the recording unit through the recording solution passage.

The heating means may be a combination of a resistance heater, a laser unit (which changes in output according to the recording information), and a laser beam absorber (optical-thermal converter). The laser unit may be a semiconductor laser unit, which is easy to control and permits the head to be constructed small and light. The resistance heater may be formed from an electrically conductive material (such as polysilicon) attached directly to the recording unit.

The recording method of the present invention may be used for plain paper (such as PPC paper) and wood-free paper (such as art paper). For high-quality images with good gradation and high density, special paper may be used which is coated with a resin (such as polyester, polycarbonate, acetate, CAB, and polyvinyl chloride) which permits color development of the dye. In order to improve the stability of recorded images, the printed paper may be laminated with a resin film after recording.

The recording method of the present invention can produces full-color images if the above-mentioned process of recording is repeated according to the image signals for the subtractive primaries (or yellow, magenta, and cyan) by using recording solutions, each containing at least one dye taking on one of the subtractive primaries.

EXAMPLES

The invention will be described with reference to the examples that follow.

The first embodiment of the present invention for the non-contact thermal-type ink jet printer (such as video printer) is illustrated in FIGS. 1 to 9.

The recording system in this embodiment employs the printer head 70 shown in FIG. 1. This head is designed to be heated by a laser beam. The printer head 70 may be modified as shown in FIG. 2 in order to improve the absorption of laser light.

Figure 2:
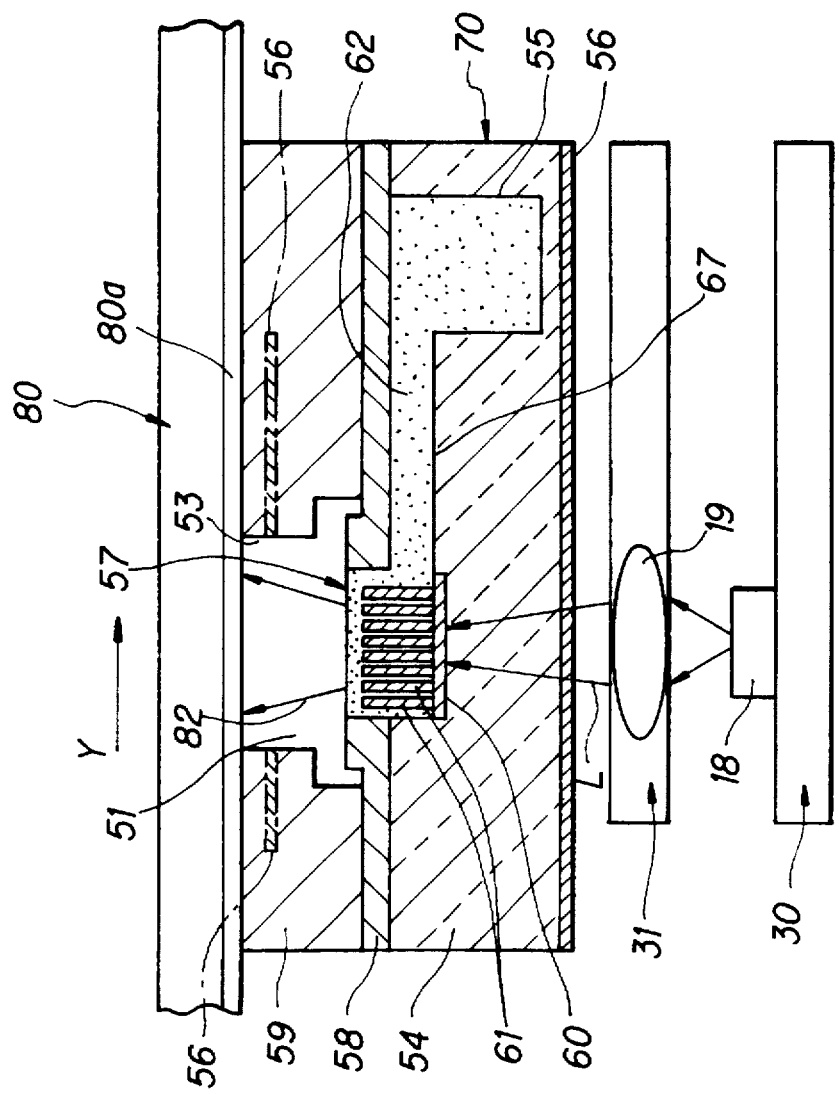
FIG. 2 is a sectional view of the modified printer head used in the first embodiment of the present invention.
Figure 3:
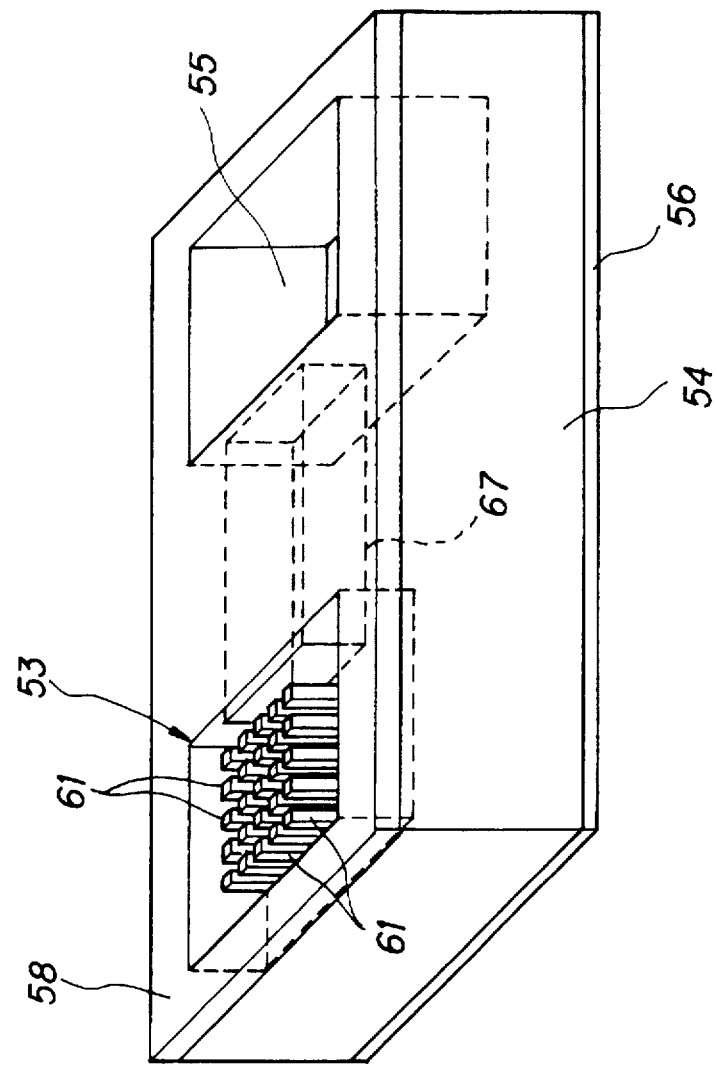
FIG. 3 is a perspective view of an important part of the printer head.

The printer heads 70, 70 shown in FIGS. 1 and 2 are the same in basic structure. The one shown in FIG. 2 has an optical-thermal converter 60 (capable of absorbing laser light) which is attached to the recording solution heating unit or evaporating unit 57. There are shown the recording solution 62 (composed of a carrier or solvent and a heat-fusible dye) and the minute gap 51 between the head and the opposite printing paper 80.

The recording solution (or liquefied dye) 62 above the recording unit is selectively heated by a laser beam L (or any other adequate heating means), so that the recording solution is made into minute droplets which are forced to fly across the gap 51. In this way an image having a continuous gradation is formed on the printing paper 80. By repeating this process for image signals corresponding to the subtractive primaries (or yellow, magenta, and cyan), it is possible to produce full-color images.

The above-mentioned gap 51 should be 10–50 µm, preferably 50–200 µm. If the gap 51 is smaller than 10 µm, the head would come into contact with the printing paper while it is moving. This makes the image transfer unstable. If the gap 51 is larger than 500 µm, the recording solution does not reach the printing paper efficiently. This lowers the transfer sensitivity and image resolution.

In this recording system, the printer head 70 should preferably be positioned vertically so that the printing paper 80 is above the evaporating unit 57 and the droplets 82 of the recording solution are forced to fly upward as they are formed by irradiation with the laser light L which is emitted from the laser unit 18 and condensed by the condenser lens 19.

The head base 54, which is transparent to laser light, has the dye reservoir 55. The head base 54 also has the spacer 58 fixed to its top. The liquefied dye (or recording solution) 62 is held between the head base 54 and the spacer 58 and is continuously fed to the evaporating unit 57 through the dye passage 67. The evaporating unit 57 is composed of a number of small columnar bodies 61 which are formed by RIE or lithography. These columnar bodies feed and hold the dye by their capillary action. This contributes to the efficient supply of the dye to the evaporating unit 57 and the efficient evaporation of the dye.

The small columnar bodies 61 are heat-resistant up to 300° C. or above. They are composed of a number of round or square columns, regularly arranged in three or more rows and three or more columns at intervals (d) of 0.2–3 μm (preferably 0.5–3 μm), each having a height of 2–15 μm (preferably 2–10 μm) and a diameter or side length (t) of 0.2–3 μm (preferably 0.5–3 μm). See FIGS. 4 and 5.

The columnar bodies have such a large surface area that they spontaneously introduce the recording solution to the heating unit (transfer unit or evaporating unit) by capillary action. They also prevent the phenomenon that the recording solution which is locally heated by the transfer unit at the time of transfer moves to the unheated part. This phenomenon (escape phenomenon) is due to the fact that the surface tension depends on temperature. The same effect as mentioned above is produced even in the case where the columnar bodies are of plate-type structure, maze-type structure, or cross-type structure, as shown in FIG. 5.

If the columnar bodies 61 are lower than 2 μm, the columnar bodies 61 do not prevent the escape phenomenon. If the columnar bodies 61 are higher than 15 μm, the columnar bodies do not heat the recording solution efficiently (which is present in an excess amount). If the columnar bodies 61 are thinner than 0.2 μm, the columnar bodies are liable to breakage by the recording solution which vibrates as it is heated for recording. If the columnar bodies 61 are thicker than 3 μm, the columnar bodies hold only a small amount of the recording solution. This leads to a decreased transfer sensitivity. If the intervals between columnar bodies 61 are smaller than 0.2 μm, the columnar bodies hold only a small amount of the recording solution. This also leads to a decreased transfer sensitivity. If the intervals between columnar bodies 61 are larger than 3 μm, the columnar bodies do not prevent the escape phenomenon at the time of transfer. The limitation on the size of the columnar bodies is also applicable to those of plate-type structure, maze-type structure, or cross-type structure, as shown in FIG. 5.

Figure 5:
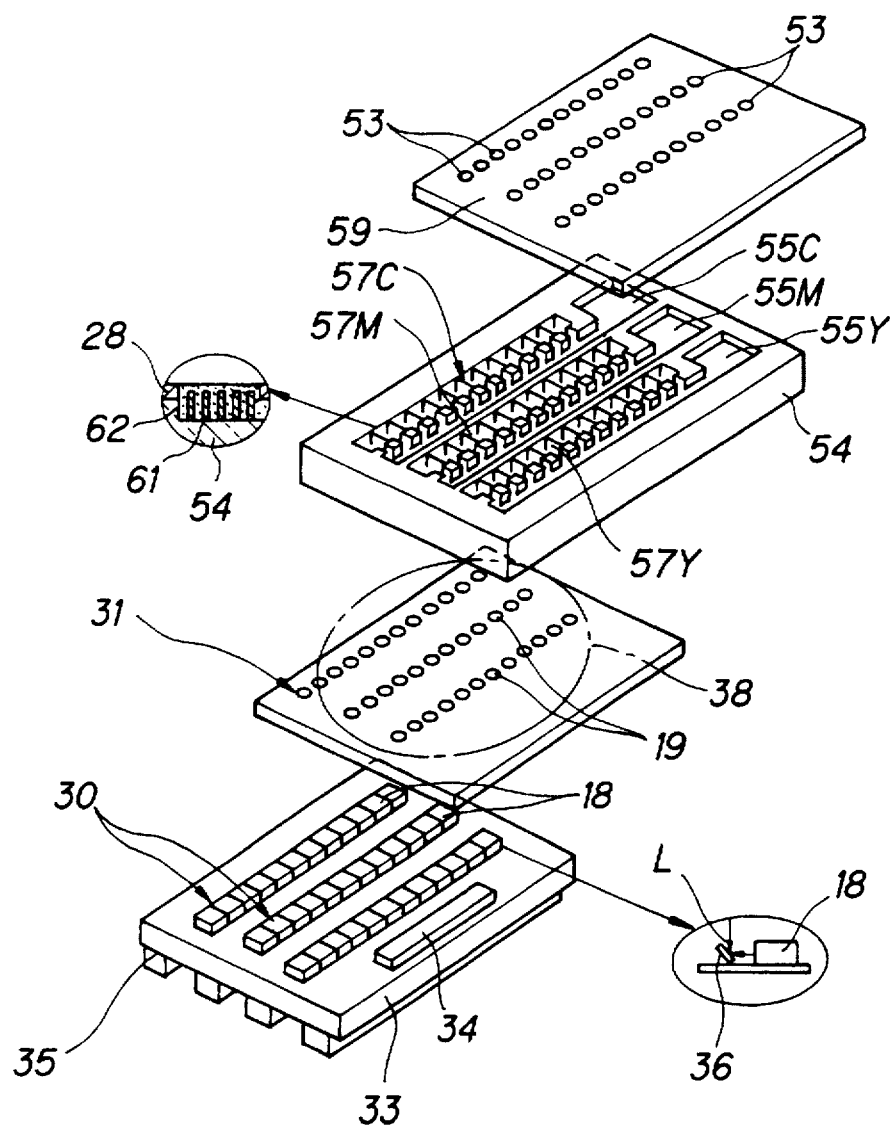
FIG. 5 is an exploded perspective view of the printer head.

The top view of the columnar bodies 61 may be square, rectangle, or cross, as shown in FIG. 5. The columnar bodies 61 may be arranged like matrix in 2–100 rows and 2–100 columns.

In FIG. 2, there is shown the protective plate 59 on the spacer 58. The protective plate 59 secures the gap 51 and guides the printing paper 80 moving in the Y direction. The protective plate 59 may have the heater 56 embedded therein (as indicated by an imaginary line) so that the above-mentioned liquefied state is maintained. In this case, the heater 56 is fixed to the outside of the base 54 holding the dye. It may also be embedded in the dye passage 67 and the dye reservoir 55.

The base 54 of the printer head is made of a heat-resistant inorganic material such as glass, metal, silicon, and ceramics, or an organic polymer, such as polyimide and aramid, which is resistant to heat above 300° C. Providing the recording head with an adequate heat insulator makes it possible to use a recording solution having a melting point higher than room temperature.

During transfer, the recording solution 62 is smoothly fed from the dye reservoir 55 to the evaporating unit 57 through the dye passage 67 which has a sectional area larger than 50 μm², so long as the recording solution 62 has a viscosity lower than 10 cps at 150° C. or below. This smooth feeding ensures a certain level of sensitivity during transfer.

The recording solution 62 contains a disperse dye or solvent dye as the coloring agent. Two or more dyes may be used in combination with one another so as to adjust the hue and sensitivity.

The recording solution should contain the above-mentioned dye or pigment dissolved or dispersed in a solvent (carrier) having a melting point lower than 50° C. and a boiling point higher than 150° C. (preferably 250°–400° C.) at 1 atm. On heating, this solvent evaporates and expands 50 times the original volume, thereby generating a pressure which makes the recording solution into minute droplets and forces them to fly through the gap 51 to the printing paper 80. The droplets contain the dye in an amount corresponding to the image information.

With a boiling point lower than 150° C., the solvent evaporates too rapidly and escapes from the evaporating unit of the head, with the result that the coloring agent alone remains in the recording solution. With a boiling point higher than 400° C., the solvent does not expand sufficiently when heated for recording.

The solvent should preferably be colorless and transparent and be capable of dissolving or dispersing the above-mentioned dye. Moreover, it should preferably be thermally stable at temperatures lower than its boiling point. It may be selected from aromatic dialkyl esters (such as dimethyl phthalate) or aromatic hydrocarbons (such as alkylbenzene) as mentioned above.

The recording method of the present invention may be applied to printing paper 80 having a dye receiving layer 80a. There are no specific restrictions on the type of recording paper so long as it is adequately compatible with the transferred dye and is capable of readily receiving the transferred dye, promoting color development, and fixing the dye.

The printing paper should preferably be one which is coated with polyester resin, polyvinyl chloride resin, or acetate resin, which is highly compatible with the disperse dye. Plain paper and art paper are suitable for acid dyes and direct dyes. If the above-mentioned carrier readily infiltrates into plain paper and is capable of color development of the disperse dye or solvent dye, then it is possible to use the disperse dye or solvent dye for plain paper and art paper despite their poor compatibility.

In the case of a wax-based carrier, in which the dye or pigment is dissolved or dispersed for color development, it is possible to transfer the recording solution to any material, such as tissue paper and cloth, other than plain paper, so long as it is receptive to wax. The transferred dye is fixed by heating for infiltration into the dye receiving layer.

There are several heating means for ink transfer: heating by the thermal head, heating by a laser beam, and heating by a combination of a laser beam and an optical-thermal converter (a material which absorbs laser light to convert its optical energy into thermal energy).

Heating by a laser beam offers the advantage of affording a greatly improved resolution and permitting concentrated heating by means of an optical system to increase the laser light density, which results in a high temperature and contributes to heating efficiency.

For efficient practice, heating by a laser beam is realized by using a semiconductor multiple laser unit (which is composed of a few to several hundreds of semiconductor laser elements arranged straight). Heating with such a laser unit greatly reduces the time required to transfer one image. Incidentally, the optical-thermal converter 60 (in FIG. 2) should have good heat resistance because it continuously absorbs laser light (or light energy).

The above-mentioned optical-thermal converter 60 may be a thin metal film or a laminate composed of a thin metal film and a thin ceramic film having a high dielectric constant, both having an absorption band corresponding to the wavelength of the laser employed. It may be attached directly to the transfer unit as shown in FIG. 2. It may be omitted if the recording solution is incorporated with light-absorbing fine particles uniformly dispersed therein, such as carbon black, metal fine particles, and heat-resistant organic dyestuff or organometallic dyestuff (including phthalocyanine, naphthalocyanine, cyanine, and anthraquinone).

It is possible to use simultaneously three kinds of laser beams having different wavelengths (red, green, and blue), generated by a gas laser unit or semiconductor laser unit or by a wavelength converter. Such laser beams as the heating source are absorbed by the recording solution itself; therefore, this obviates the necessity of using the optical-thermal converter.

Figure 6:
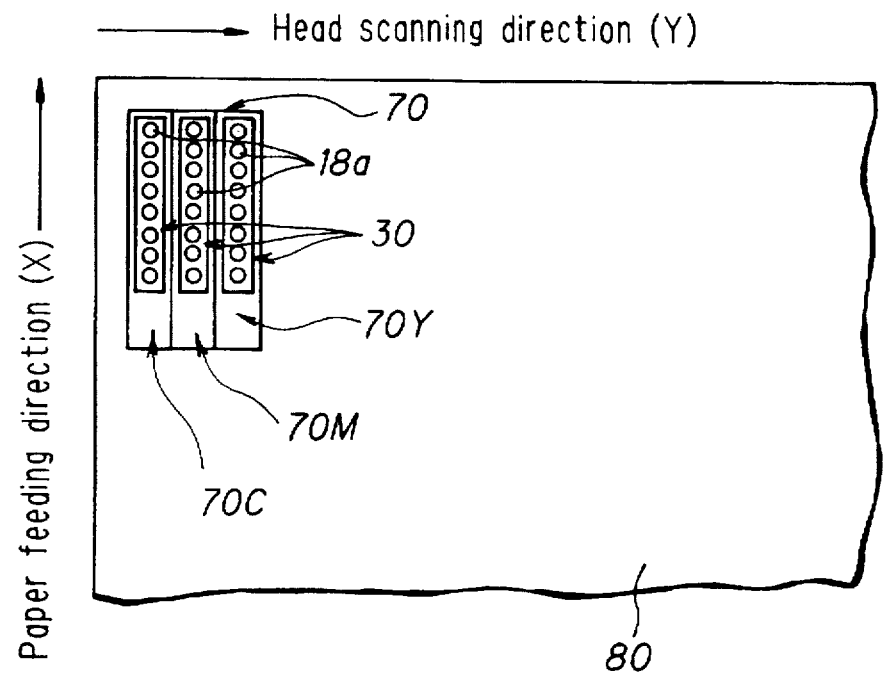
FIG. 6 is a schematic rear plan view showing how the printer head performs scanning.

The entire printer head is shown in FIG. 5. It has the base 54 in which are formed the dye reservoirs 55C, 55M, and 55Y for cyan, magenta, and yellow dyes, respectively, which are used for full-color printing. In the base 54 are also formed the dye holders or the dye supply heads 70C, 70M, and 70Y for cyan, magenta, and yellow dyes, respectively, as shown in FIG. 6. Thus, the recording solutions for respective colors are fed to the lined-up evaporating units 57C, 57M, and 57Y, each capable of forming 12–24 dots.

The evaporating units are irradiated individually with laser beams emitted from the multi-laser array 30 (composed of laser units 18, for example, 24 semiconductor laser chips) and condensed by the microlens array 31 (composed of a number of condenser lenses 19). The laser beams (L) are turned by 90 degrees by the mirrors 36.

The microlens array 31 may be replaced by a single condenser lens 38 having a large diameter, as indicated by an imaginary line. This condenser lens 38 is constructed such that the path of refraction varies so that the position of the outgoing beams corresponds to the evaporating units 57C, 57M, and 57Y according to the position of the incident beams. Incidentally, the multi-laser array 30 is controlled and driven by the control IC 34 on the board 33. Also, it is provided with the heat sink 35 for sufficient heat radiation.

Figure 7:
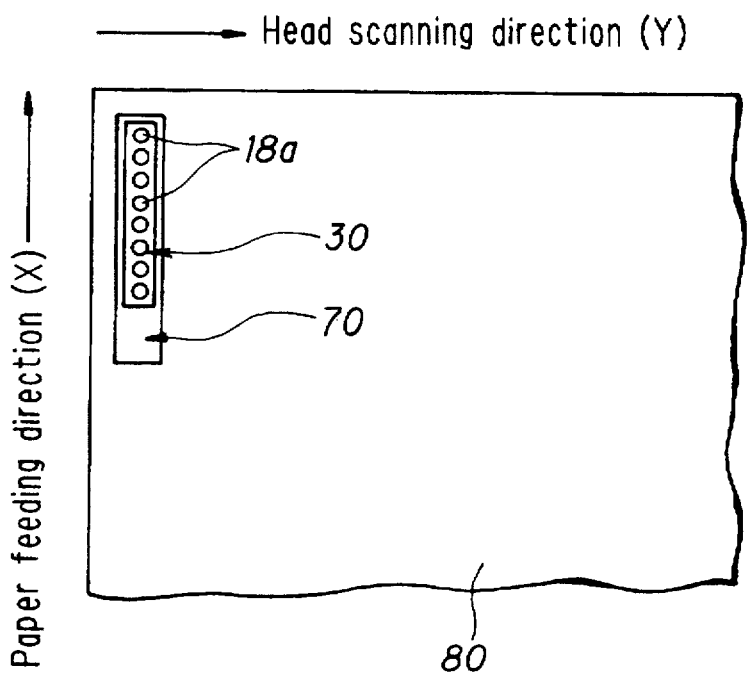
FIG. 7 is a schematic rear plan view showing how the printer head (for mono-color recording) performs scanning.

In the case of monocolor printing, the one-dimensional multi-laser array 30 is used as shown in FIG. 7. This laser array is constructed such that the individual laser elements are activated independently and parallel, so that the printing speed becomes high in proportion to the number of beams. (For example, a 24-fold printing speed is obtained if a 24-beam laser array is used.)

The above-mentioned printer head 70 has as many dye holders as the recording dots and also has as many laser emitting points (arranged in array) as the recording dots.

With the above-mentioned printer head 70, the printer performs printing by feeding the paper in the longitudinal direction (X direction) and scanning the printing head in the lateral direction (Y direction) which is perpendicular to the X direction. The paper feeding in the longitudinal direction and the scanning in the lateral direction take place alternately.

Figure 8:
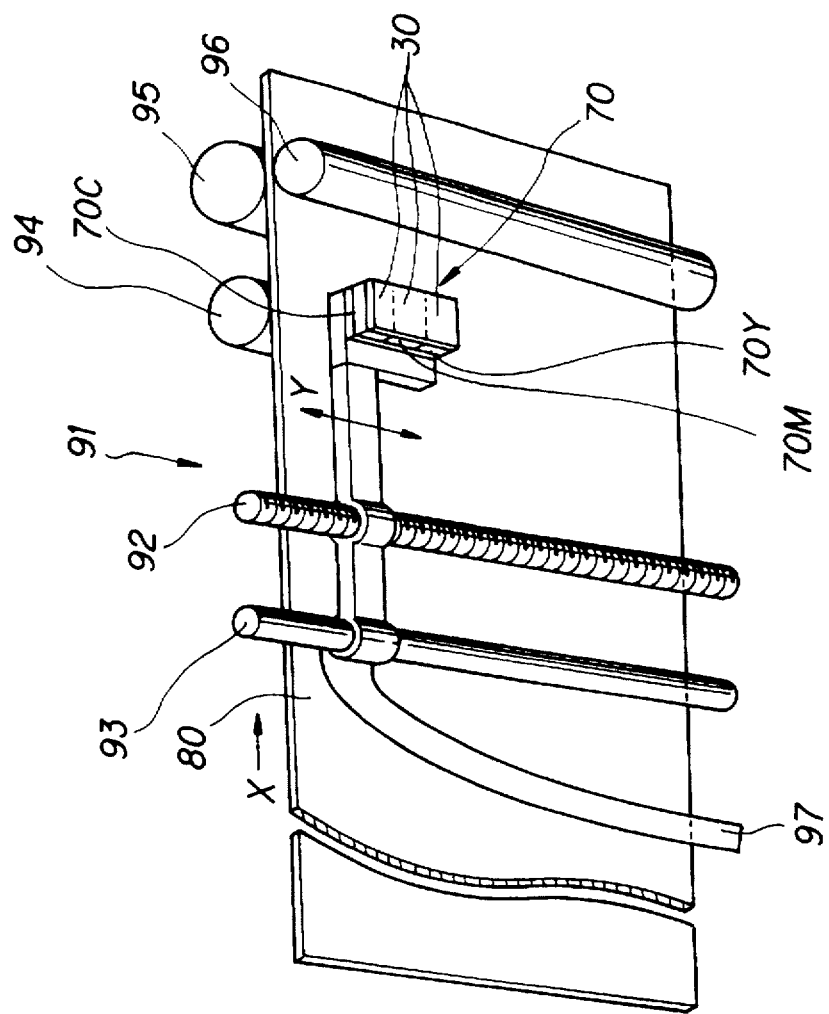
FIG. 8 is a schematic perspective view (looking upward) of the printer.

In the printer 91 shown in FIG. 8, the printer head 70 for full-color printing is supported by the head supporting shaft 93 and is moved back and forth in the Y direction by the head feeding screw shaft 92.

Over the printer head 70 is rotatably mounted the head receiving roll 94, with the printing paper 80 held between them. The printer paper 80 is held between the paper drive roll 95 and the driven roll 96 and is moved in the X direction.

Incidentally, the printer head 70 is connected to the head drive circuit board (not shown) through the flexible harness 97.

The recording system pertaining to this example uses the advantages of the thermal transfer system and the ink jet system. The non-contact-type thermal ink jet printer mentioned above involves no waste materials and requires a less amount of transfer energy, and it is small in size and light in weight.

This recording system is characterized by the printer head 70 (such as serial printer head) which has the evaporating unit 57 holding the recording solution 62 composed of a heat-melting dye and a solvent. Opposite to the recording head is the printing paper 80 (recording medium) which has the dye receiving layer 80a receptive to the droplets 82 of the recording solution which are formed by heating. There is the minute gap 51 (10–100 μm) between the recording head and the printing paper.

The recording solution 62 held in the dye holder of the evaporating unit 57 of the recording head is selectively heated to the vicinity of its boiling point by irradiation with a laser beam (L), so that the recording solution is made into droplets and the droplets 82 are forced to fly from the evaporation hole 53. The droplets fly through the gap 51 and reach the printing paper 80. In this way there is obtained an image having a continuous gradation. This process is repeated for the subtractive primaries (or yellow, magenta, and cyan) according to the image signals to accomplish full-color printing.

In this recording system, it is desirable that the printer head 70 be positioned vertically, with the printing paper 80 placed over it, so that the droplets 82 are forced to fly upward. The laser beam (L) emitted from the laser unit 18 is condensed by the condenser lens 19 at the vicinity of the top of the evaporating unit 57.

Figure 9:
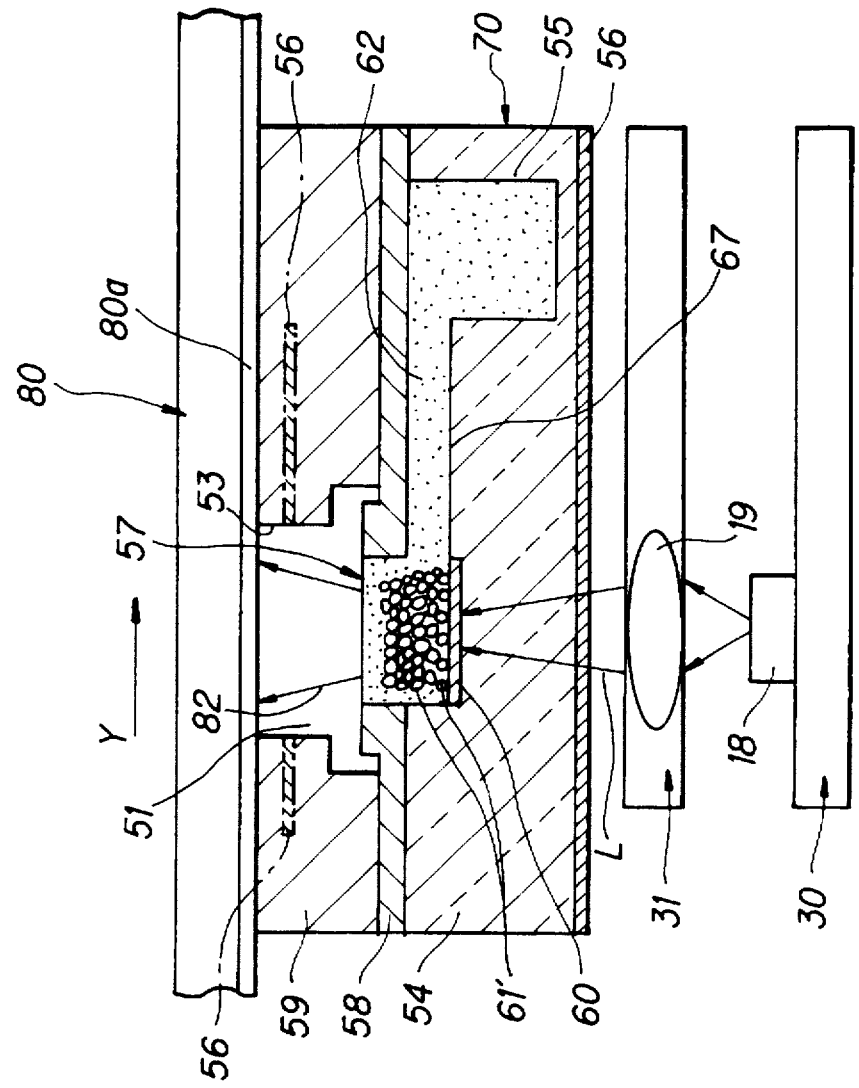
FIG. 9 is a sectional view of another modified printer head.

The head base 54, which is transparent to the laser light, is provided with the dye reservoir 55, so that the liquefied dye 62 is held in the space between the head base 54 and the spacer 58 (which functions as a lid fixed to the head base 54). The liquefied dye 62 is fed from there to the evaporating unit 57 through the dye passage 67. The columnar bodies 61 are provided as shown in FIGS. 1 and 2 in order that the dye is supplied efficiently to the evaporating unit 57 and evaporated efficiently by the evaporating unit 57 and in order to prevent the dye from escaping as the result of the dye's surface tension decreasing due to heating and to continuously feed and maintain the dye by capillary action. The columnar bodies 61 may be replaced by an aggregate of small beads 61' as shown in FIG. 9.

The thermal-type ink jet printer mentioned above permits the dye to be fed continuously to the evaporating unit as the dye is consumed for recording, because as much dye as consumed is supplied spontaneously or by force from the dye reservoir to the evaporating unit. Alternatively, the continuous supply of the dye to the evaporating unit may be accomplished by moving an adequate substrate coated with the dye to the transfer unit. This operation is possible because the dye is supplied in the form of solution in a solvent (carrier).

The evaporating unit for recording can be used many times repeatedly. Therefore, this printing system is advantageous in material saving and environmental protection over the conventional thermal transfer system that employs the thermal head and throwaway ink sheet.

The recording system to perform recording by forcing droplets to fly offer the advantage that recording can be accomplished without the dye layer coming into contact with the recording medium (printing paper). Therefore, this recording system is free from the reverse transfer and mixing of the dye which occurs when printing is repeated by the thermal transfer system that employs the above-mentioned thermal head. In addition, this recording system can be operated by heating the head (including the evaporating unit) only. This leads to a considerable power saving which is not achieved by the above-mentioned thermal transfer system.

This recording system employs the small dye reservoir from which to supply the dye, in place of the ink sheet. This permits the printer to be made small in size and light in weight.

This recording system performs recording by forcing the droplets of dye to fly. This obviates the necessity of heating the dye receiving layer of the recording medium as in the thermal transfer system that employs the thermal head. And this also obviates the necessity of pressing the ink sheet to the recording medium under high pressure. These lead to the printer which is small in size and light in weight.

In this recording system, the recording medium is not in contact with the dye layer in the evaporating unit and hence there is no possibility of the heat-fusion taking place. In addition, this recording system permits recording even though the compatibility between the dye and the dye receiving resin layer is limited. This contributes to freedom for the design and selection of the dye and dye receiving resin layer.

This recording system employs the laser unit 18 (semiconductor laser) as the heat energy source for making the dye into droplets. The semiconductor laser offers the advantage of high efficiency of conversion from electric power into light. It transmits thermal energy efficiently to the dye owing to its outstanding directivity and its outstanding ability to be condensed. Thus, this recording system is by far superior in total energy efficiency to the conventional system (such as thermal transfer with a thermal head or ink jet). This favors size reduction and power saving.

Owing to the semiconductor laser, which permits easy control of output power and pulse width, this recording system easily realizes images with multiple gradations, unlike color printing by the conventional ink jet system. In other words, this recording system converts electrical images produced by a color video camera into dye images by means of the semiconductor laser which is activated according to image signals. Thus, this recording system can form full-color images, each having 128 gradations per color. The full-color images are comparable in quality to silver salt photographs.

Figure 10:
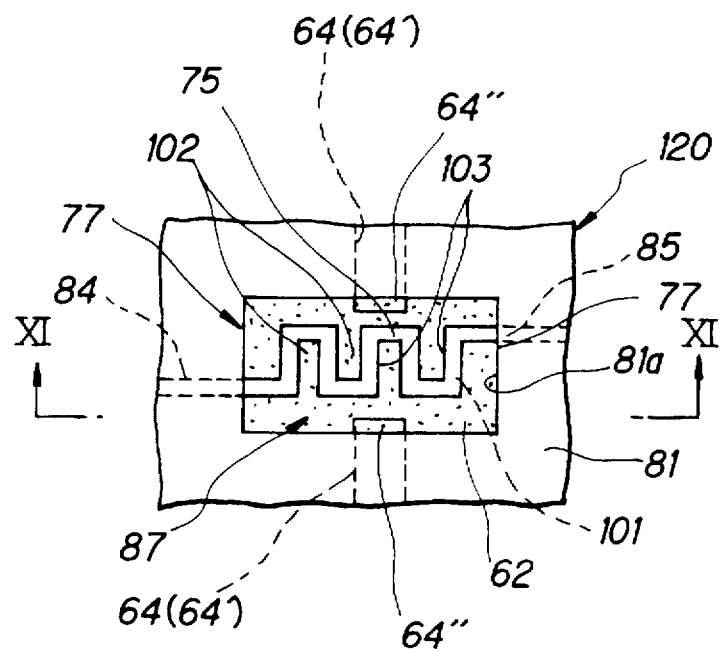
FIG. 10 is a plan view of the printer head used in the embodiment of the present invention.
Figure 11:
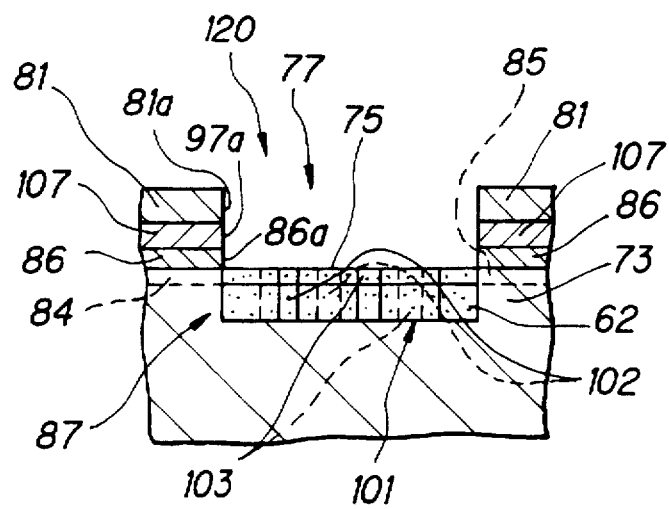
FIG. 11 is a sectional view taken along the line XI—XI in FIG. 10.
Figure 12:
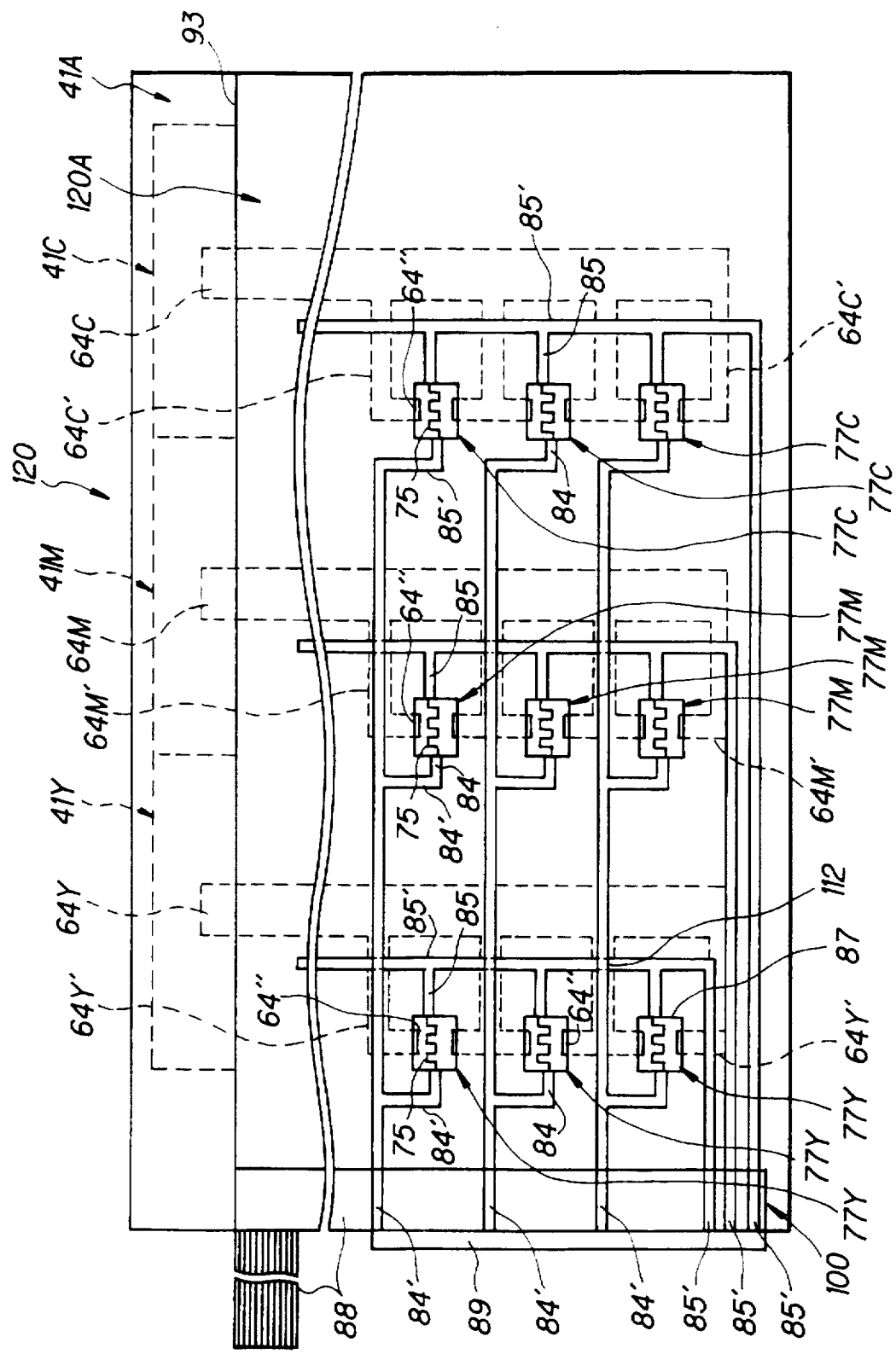
FIG. 12 is a plan view of the printer head.

The second embodiment of the present invention is illustrated in FIGS. 10 to 12. In this embodiment, the idea of the present invention is applied to the non-contact-type thermal ink jet printer.

This embodiment employs the printer head 120, which is designed such that the recording solution is made into droplets by resistance heating (as energy source) in place of the laser beam used in the previous embodiment. Therefore, the recording solution needs no infrared absorber or the head needs no optical-thermal converter 60. Except for this, the second embodiment is substantially identical with the first one.

The printer head 120 has the evaporating unit 77. The concave dye holder 87, which is, say, 50 µm deep, is formed in the base 73. The dye holder 87 has minute columnar (or wall-like) bodies 101, 0.5-3 µm wide and 2-10 µm high, which are made by RIE or lithography from the same vitreous material as the base 73. The columnar bodies or wall-like bodies are arranged in a meandering pattern.

The height of the columnar bodies 101 ranges from the bottom to the top of the dye holder 87. The meandering pattern has narrow gaps 102 disposed alternately. These gaps 102 constitute the porous structure. Also, these gaps 102 hold the liquefied dye 62 in the dye holder by capillary action and supply upward as much liquefied dye 62 as required for one dot.

On the top of the columnar bodies 101 is laminated the heating body 75, which is, say, 1 µm thick. The laminate has the same meandering pattern as the columnar bodies 101. Under the heating body 75 are the columnar bodies 101 of porous structure. This heating body 75 is at the same level as or slightly below the liquefied dye 62 in the dye holder 87. The latter case is desirable from the standpoint of efficient evaporation and feeding.

The heating body 75 also has the gaps 103 which coincide with those in the columnar bodies 101. The gaps 102 and the gaps 103 generate the capillary action which holds and feed the dye efficiently.

The heating body 75 is a thin-film resistance formed from carbon or polysilicon by etching. The heating body 75 covers the dye holder 87 and has a pair of aluminum electrodes 84, 85 attached to both sides thereof. Across the electrodes are applied a voltage in response to the image signals through matrix driving. Thus, the electric power generates heat in the range of 50° C. to 500° C. This heat efficiently evaporates the liquefied dye 62 from its surface. This heat does not dissipate into the base 73 because there are the columnar bodies 101 made of glass under the heating body 75.

On the top of the electrodes 84 and 85 is formed the insulating layer 86 of silicon oxide which electrically isolates the electrodes 84 and 85 from each other. This insulating layer 86 may also function as a heat insulator. On the insulating layer 86 is formed the dye solution stopping layer 107 made of fluoroplastic or silicone resin, so as to prevent the liquefied dye 62 from leaking upward. On the dye solution stopping layer 107 is the protective layer 81 made of tantalum or glass. These layers 81, 86, 107 have the openings 81a, 86a, 97a.

In actual, the printer head 120 has the evaporating unit 77 in multiple for each color (yellow Y, magenta M, cyan C) to achieve full-color printing. The evaporating units 77Y, 77M, 77C are supplied with the respective liquefied dyes of different color from the respective dye reservoirs 41Y, 41M, 41C through the respective inlets 64Y, 64M, 64C and the respective passages 64Y', 64M', 64C' and inlets 64".

The electrodes 84, 85 of the heating body 75 have wires 84' 85' which extend on the base 73 and lead to the control board (tab) 88 soldered to the connector 100. The wires 84' and 85' are isolated from each other by an insulating film of silicon oxide at their intersection 112. On the control board is mounted the control IC 89 which supplies drive signals by matrix drive.

The drive signals select the heating body 75 and turn it on to evaporate the dye. The unselected heating body 75 makes use of remaining heat to keep the liquefied dye hot. In other words, by driving the heating body 75 alternately (and hence utilizing remaining heat), it is possible to either liquefy or cool the dye efficiently. For liquefaction of the dye, it is possible to install the heater 56 (shown in FIGS. 1 and 2) on each evaporating unit or base, although not shown. Incidentally, the printer head 120 is constructed of the head proper 120A and the dye reservoir proper 41A, which are joined together, with the mating surfaces 93, 94 between.

The dye holder 87 has the heating body 75 at the surface of the liquefied dye 62. This structure is effective in heating and evaporating the liquefied dye, which leads to efficient transfer. In addition, this structure needs no laser and hence is inexpensive. When the heating body 75 is not driven, the surface temperature of the dye 62 decreases rapidly, which results in good response characteristics.

Under the heating body 75 are minute meandering columnar bodies 101 (in porous structure) to hold and feed the dye 22. This means that the evaporating unit 77 is provided with the capillary structure, whose capillary action prevents the dye from escaping and holds and feed the dye efficiently and quantitatively. The result is efficient heat conduction from the heating body 75, efficient evaporation, and constant supply and evaporation of the dye. All this leads to high-quality images.

The heating body 75 installed above the capillary structure contributes to efficient heating with a minimum of heat loss. (Remaining heat can be utilized to liquefy the dye and to heat the printing paper 80 for dye fixing. This saves the energy for fixing.) The result is a smaller cooling fan, which leads to cost reduction.

The head in this embodiment permits the dye to be heated by the heating body 56 as shown in FIG. 1 and 2. The liquefied dye 62 is led to the evaporating unit 77 by the capillary action of the inlet 64.

The solution stopping layer 107 keeps constant the amount of the liquefied dye in the evaporating unit 77 and hence there is no possibility of the liquefied dye overflowing the protective layer 81. When the dye is heated by the heating body 75, the liquefied dye is retained by the columnar bodies 101 formed by microfabrication. As the result, the dye does not escape regardless of difference in surface tension.

The heating body 75 (and the heater 56) heat the spacer (not shown) which constitutes part of the inlet 64, and the heating body 75 generates heat in response to image signals at the time of color printing on the printing paper 80. This evaporates the dye near the heating body 75, and the evaporated dye passes through the opening 81a of the protective layer 81. Thus the dye is transferred to the dye receiving layer 80a of the printing paper 80 in the order of Y, M, and C.

The printer head 120 in this embodiment is of thermal transfer type like the one shown in FIGS. 1 and 2. It heats the recording solution containing the liquefied dye 62 and causes the droplets of the recording solution to fly to the printing paper 80 through a gap. Therefore, it offers the advantage of small size, easy maintenance, promptness, high-quality image, and high gradation.

In this embodiment, the columnar bodies 101 and base 73 are made of glass; however, they may be made of other material, such as polyimide or other polymeric materials. The material is not specifically restricted because the printer head 120 does not experience pressure from the printing paper 80. In addition, such materials function as a good thermal insulator which reduces dissipation of heat from the heating body 75 during operation.

Figure 13:
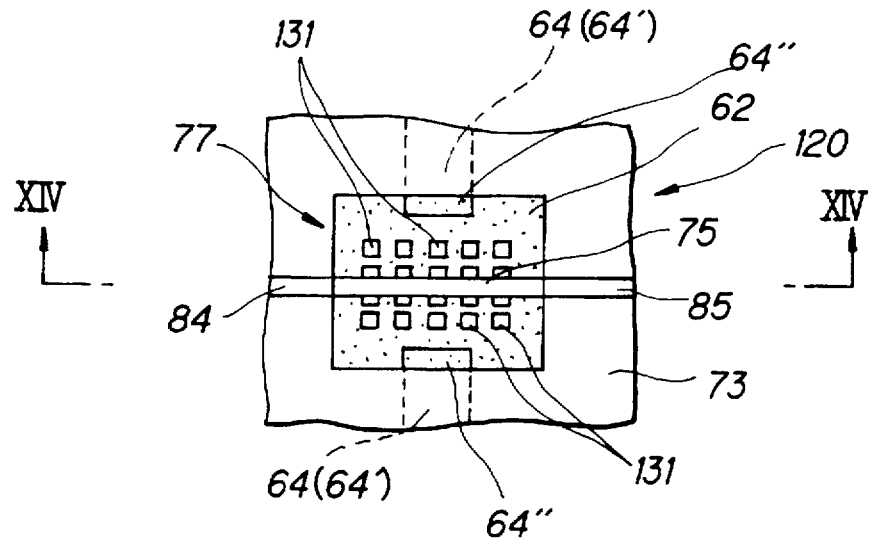
FIG. 13 is a plan view of an important part of the printer head used in the third embodiment of the present invention.
Figure 14:
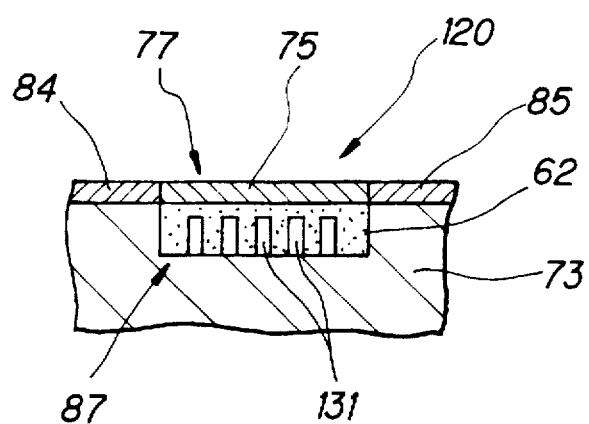
FIG. 14 is a sectional view taken along the line XIV—XIV in FIG. 13.

The third embodiment of the present invention is illustrated in FIGS. 13 and 14. In this embodiment the idea of the present invention is applied to the non-contact-type thermal ink jet printer.

In this embodiment, the columnar bodies 131 of glass are formed by microfabrication (such as RIE and lithography) when the base 73 is formed. A certain distance above the columnar bodies 131 are formed the heating body 75 (3–5 μm wide). Except for these differences, this embodiment is identical with the second one in which the heating body 75 is formed on the top of the columnar bodies 101. In this embodiment, the heating body 75 may be straight because the columnar bodies 131 produce capillary action.

Owing to the capillary action of the columnar bodies 131, the above-mentioned structure prevents the liquefied dye 62 from escaping and perform efficient heating on the dye surface even thought the columnar bodies 131 are away from the heating body 75 or the heating body 75 takes on a narrow straight shape. The heating body 75 placed on the top heats the printing paper only at the time of printing or adds heat to the previously heated printing paper, as in the case mentioned above.

Printing was performed using the recording method in each embodiment mentioned above. The results of Examples 1 to 4 are given below. For comparison, the results of Comparative Examples 1 to 3 are also given below.

EXAMPLE 1

A transfer head, as shown in FIGS. 2 and 5, was formed on a transparent substrate of Pyrex by RIE and powder beam etching. This transfer head has 100 round columns, each 2 μm in diameter and 8 μm high, arranged at intervals of 2 μm, in 10 columns and in 10 rows. The recording unit has a carbon layer (formed by deposition) for infrared absorption. The recording solution and printing paper used are shown below. They are tested in the following manner.

Recording solution

Each recording solution (yellow, magenta, cyan) was prepared by dissolving 15 wt % each of solvent yellow 56, disperse red 1, and solvent blue 35 in dibutyl phthalate at 50° C. The recording solution (at 50° C.) was introduced into the ink reservoir of the transfer head. It spontaneously entered the recording unit through the passage.

Printing paper

Three kinds of printing paper were used.

PPC paper

Ink jet printing paper (TLB 5A 4S, from Canon)

Sublimate transfer paper (VPM 30STA, from Sony)

Transfer test

The transfer head holding the recording solution was built into the transfer unit as shown in FIG. 2, and the printing paper was placed in position, with distance between the printing paper and the transfer head adjusted to 50 μm. While the printing paper was moving, the recording unit was irradiated with laser pulses, with the duration of pulse ranging in 256 steps from 1×10 μs to 256×10 μs according to image information. The laser had a wavelength of 850 nm and was emitted from the semiconductor layer unit. The laser beam was condensed by the optical system into a spot measuring 6×10 μm on the carbon layer of the transfer head. The output of the laser at convergence was 20 mW.

The maximum sensitivity (in terms of optical density) was measured using a Macbeth densitometer. The results are shown below.

| Paper | Maximum sensitivity | | | Resolution |
| | Yellow | Magenta | Cyan | (DPI) |
| --- | --- | --- | --- | --- |
| PPC paper | 1.1 | 1.2 | 1.1 | 120 |
| Ink jet paper | 1.5 | 1.7 | 1.6 | 200 |
| Sublimate paper | 2.0 | 2.2 | 2.2 | 300 |

Printing was repeated on 5000 sheets of paper (in terms of A4 size paper). All the printed images were completely free from contaminants due to deterioration.

Figure 15:
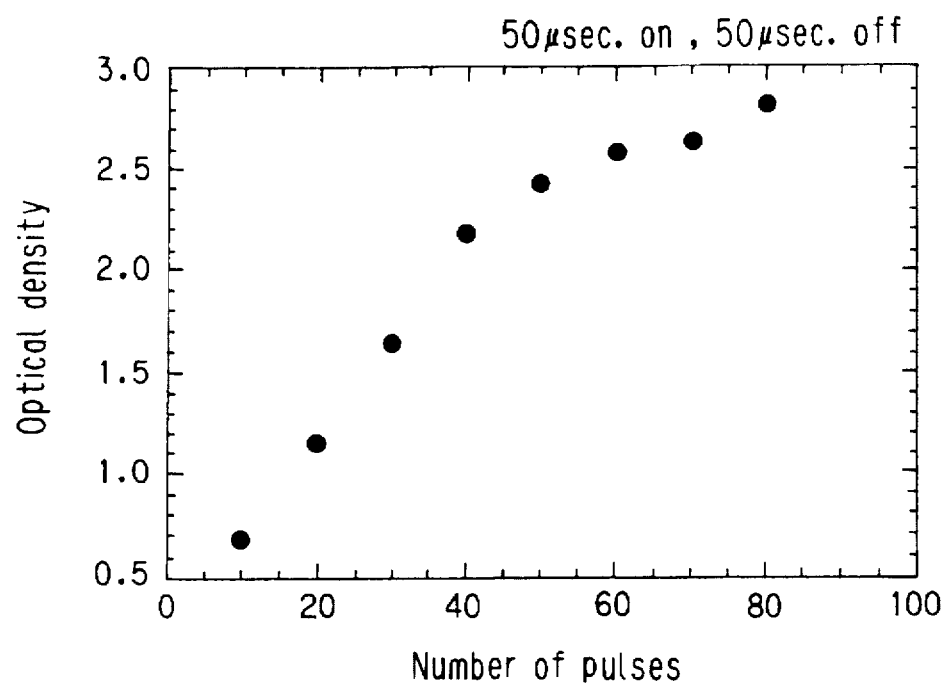
FIG. 15 is a graph showing how the transfer sensitivity (optical density) varies according to the number of laser pulses in the present invention.
Figure 16:
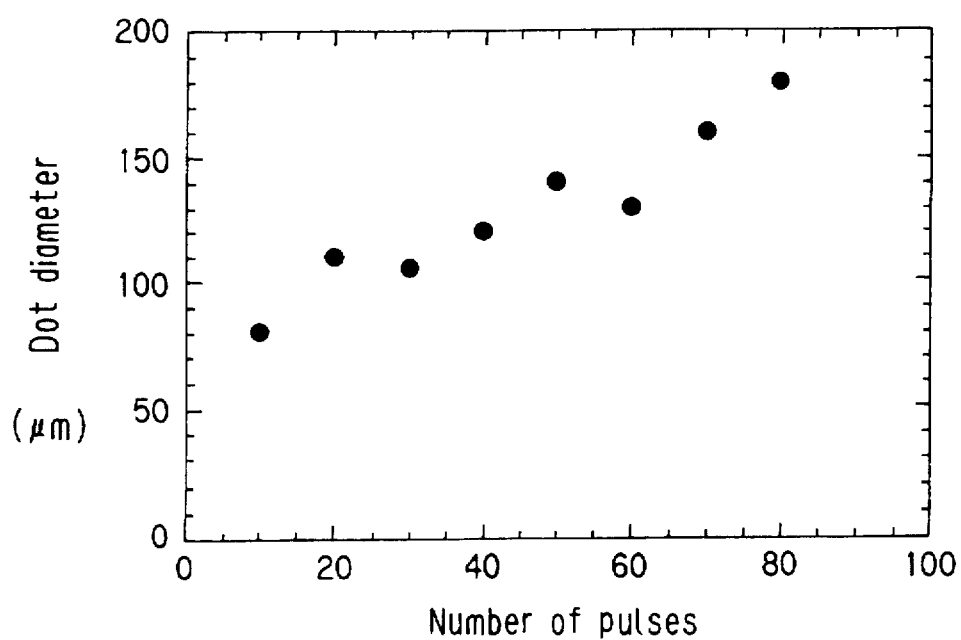
FIG. 16 is a graph showing how the resolution (dot diameter) varies according to the number of laser pulses in the present invention.
Figure 17:
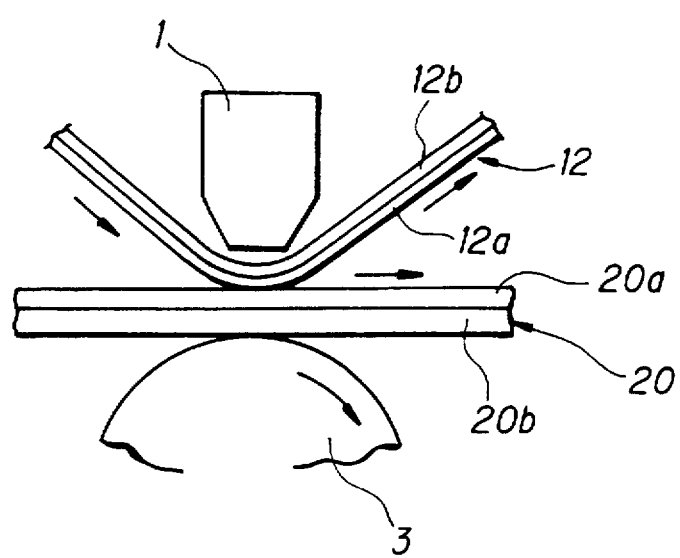
FIG. 17 is a front view of an important part of the recording apparatus using the conventional heat-sensitive recording head.

In printing with the cyan dye under the above-mentioned conditions, the transfer sensitivity and resolution were tested by changing the number of laser pulses, each cycle consisting of 50 µs (ON) and 50 µs (OFF). The results are shown in FIGS. 15 and 16. It is noted that when the number of laser pulses is 40, the optical density is 2.2 and the resolution is about 300 DPI (or 120 µm in diameter). This result is satisfactory.

EXAMPLE 2

The same procedure as in Example 1 was repeated except that the transfer head was replaced by the one in which a resistance heater of polysilicon was attached to the glass base, as shown in FIGS. 10 and 11. The resistance is 800Ω and the pulse voltage is 4V, and consequently the power applied to the resistance is 20 mW (the same value as in Example 1).

The maximum sensitivity (in terms of optical density) was measured using a Macbeth densitometer. The results are shown below.

|  | Maximum sensitivity | | | Resolution |
| --- | --- | --- | --- | --- |
| Paper | Yellow | Magenta | Cyan | (DPI) |
| PPC paper | 1.0 | 1.0 | 0.9 | 100 |
| Ink jet paper | 1.3 | 1.4 | 1.4 | 180 |
| Sublimate paper | 1.8 | 2.0 | 1.9 | 280 |

Printing was repeated on 5000 sheets of paper (in terms of A4 size paper). All the printed images were completely free from contaminants due to deterioration.

Comparative Example 1

The same procedure as in Example 1 was repeated except that the minute glass columns were replaced by those which are 5 µm in diameter and 8 µm high and are arranged at intervals of 5 µm. The recording solution (at 50° C.) was introduced into the ink reservoir of the transfer head. It spontaneously entered the recording unit through the passage. However, the flow rate was only one-twentieth that in Example 1.

The recording unit was irradiated with laser under the same conditions as in Example 1. It was found that the recording solution moved outward from the irradiated part due to heating. Consequently, the transfer sensitivity was about one-fifth that in Example 1. In addition, the low flow rate of the recording solution caused the transfer sensitivity to decrease with time.

EXAMPLE 3

A recording solution was prepared from an azo cyan dye containing 0.5% of non-volatilizable residue which remains when heated at 200° C. in the air. Using this recording solution, experiments on transfer were carried in the same manner as in Example 1.

It was found that the recording unit was clogged due to deterioration of the dye after repeated transfer. This lowered the sensitivity of transfer.

Comparative Example 2

A recording solution was prepared from an azo cyan dye containing 0.5% of non-volatilizable residue which remains when heated at 200° C. in the air. Using this recording solution, experiments on transfer were carried in the same manner as in Comparative Example 1.

It was found that the recording unit was clogged due to deterioration of the dye after repeated transfer. This greatly lowered the sensitivity of transfer.

Comparative Example 3

A recording solution was prepared in the same manner as in Example 1 except that the solvent was replaced by the one such as acetone which has a boiling point lower than 150° C. Using this recording solution, experiments on transfer were carried in the same manner as in Example 1. It was found that the recording solution became untransferable due to rapid evaporation of the solvent.

EXAMPLE 4

A recording solution was prepared in the same manner as in Example 1 except that the dibutyl phthalate (as a solvent) was replaced by dodecylbenzene and the concentration of each dye was reduced to 10 wt % (dissolved at −15° C.). This recording solution was transferred to PPC paper and ink jet printing paper in the same manner as in Example 1.

The images of each color were tested for Macbeth density and resolution. The following good results were obtained.

|  | PPC paper | Ink jet paper |
| --- | --- | --- |
| Dye Y (solvent yellow 56) | 1.0 | 1.4 |
| M (disperse red 1) | 1.2 | 1.5 |
| C (solvent blue 35) | 1.1 | 1.6 |
| Resolution (DPI) | 130 | 190 |

While preferred embodiments have bee described, variations thereto will be made as follows within the scope of the present inventive concepts.

For example, the porous structure to be formed in the transfer unit (heating unit or evaporating unit) is not limited to that mentioned above. It may vary in height (in the case of columns), arrangement, section, and density. It may be formed at any place where it is necessary to make porous or to expand the surface area. The porous structure may be formed with an aggregate of beads or a fibrous body instead of the columnar or wall-like body.

The energy to make the recording solution in droplets is not limited to laser. For example, it is possible to use resistance heating. This object is achieved by incorporating the recording solution with an electrically conductive substance. Any other heating means may be employed to produce the desired density gradation.

It is also possible to change the number of the recording solution holders, the number of dots, and the number of beams of the laser array corresponding to the number of dots. The configuration and size of the array are not limited to those mentioned above.

The head and printer in the present invention employ laser or heating body to heat the dye. It is possible to use them in combination. In this case evaporation takes place satisfactorily even when the power of each heating means is reduced.

The head and printer may take on any structure and shape other than those mentioned above. In addition, they may be made of any adequate material. The printer can perform full-color printing with three dyes (magenta, yellow, and cyan) and an optional black dye. It can also perform two-color printing or mono-color printing.

The above-mentioned solvents and dyes may be used in combination with one another.

The solid dye for recording may be used in the form of solution which is made into droplets. The liquefied dye (at room temperature) may be stored in the dye reservoir. The relative position of the head and the printing paper may be reversed; that is, the laser beam is directed downward.

The recording method of the present invention employs a recording head in which the recording solution heating unit has a porous structure of specific size (such as columnar bodies). The recording solution (composed a dye and a solvent) is fed to the heating unit, in which it is converted into droplets by heating. The droplets are forced to fly to the printing paper opposite to the recording head.

The porous structure contributes to increasing the surface area of the heating unit. Thus it retains the recording solution and feeds continuously the recording solution to the heating unit by capillary action. As the recording solution is heated by a heating means (such as laser beam) with an adequate amount of heat in response to the recording information, the recording solution partly evaporates, generating a pressure. This pressure produces minute droplets whose amount is proportional to the recording information corresponding to the electrical images generated by a color video camera or the like. Finally, the droplets are transferred to the printing paper.

An advantage over the conventional ink jet system is the capability of producing smaller droplets in a larger number and of controlling the number of droplets according to the amount of heating energy applied to the heating unit in response to the recording information. Thus, the recording method of the present invention permits printing in multiple gradation and affords high-quality images (full-color images) comparable to silver-salt photographs.

The recording method of the present invention permits one to produce promptly high-quality images with high gradation using a small-sized and easy-to-maintain printer.

The recording solution used for the recording method of the present invention is composed of a dye and a solvent, both having specific characteristic properties. The solvent is capable of completely dissolving or dispersing the dye and has a boiling point higher than 150° C. Therefore, the recording solution keeps its concentration. This contributes to the good recording performance.

What is claimed is:

1. An improved recording method including the steps of feeding a recording solution to a recording solution heating unit, heating the recording solution to change its state, making the recording solution into droplets, and transferring the droplets to a recording medium placed opposite to the recording solution heating unit, said recording solution being composed of a recording material and a substance which dissolves or disperses the recording material therein, characterized in that said recording solution heating unit has a porous structure formed on the front thereof, said porous structure being composed of fine parts whose dimension in the plane direction is 0.2–3 μm and whose dimension in the direction perpendicular to the plane direction is 2–15 μm, and that said recording solution is composed of a dye which vaporizes more than 90 wt % upon heating at a temperature above 300° C., leaving residues in an amount less than 10 wt %, and a solvent having a boiling point higher than 150° C. which dissolves or disperses the dye more than 5 wt % at a temperature below 50° C.

2. A recording method as defined in claim 1, wherein said porous structure has heat resistance above 300° C. and the recording solution heating unit is positioned such that the droplets of the recording solution are forced to fly to said recording medium opposite to the heating unit with a gap of 10–500 μm between.

3. A recording method as defined in claim 1, wherein said recording solution is composed of a dye and a solvent dissolving more than 5 wt % of said dye at temperatures below 50° C., said dye having a solubility parameter in the range of 7.5 to 10.5 at 25° C. and a molecular weight lower than 550 and containing less than 0.1 wt % of non-volatilizable residue which remains when heated at 200° C. in the air, said solvent having a solubility parameter in the range of 7.5 to 10.5 at 25° C., a molecular weight lower than 450, a melting point lower than 50° C., a boiling point in the range of 250° C. to 400° C., and containing less than 0.01 wt % of non-volatilizable residue which remains when heated at 200° C. in the air.

4. A recording method as defined in claim 1, wherein said dye is at least one of a disperse dye and a solvent dye.

5. A recording method as defined in claim 3, wherein said dye is at least one of a disperse dye and a solvent dye.

6. A recording method as defined in claim 1, wherein said solvent is at least one of an aromatic ester and an aromatic hydrocarbon.

7. A recording method as defined in claim 6, wherein said aromatic ester is dialkyl phthalate.

8. A recording method as defined in claim 6, wherein said aromatic hydrocarbon is n-alkylbenzene.

9. A recording method as defined in claim 4, wherein said solvent is at least one of an aromatic ester and an aromatic hydrocarbon.

10. A recording method as defined in claim 8, wherein said aromatic ester is dialkyl phthalate.

11. A recording method as defined in claim 9, wherein said aromatic hydrocarbon is n-alkylbenzene.

12. A recording method as defined in claim 1, wherein said recording solution heating unit is continuously replenished with as much the recording solution as consumed.

13. A recording method as defined in claim 1, wherein said recording solution is heated by irradiation with a laser beam.

14. A recording method as defined in claim 13, wherein said laser beam is variable in output according to the recording information and said laser beam impinges upon a laser-absorbing optical-thermal converter attached to said recording solution heating unit.

15. A recording method as defined in claim 1, wherein said recording solution is heated by a heating body installed on said recording solution heating unit.

16. A recording solution which is composed of a recording material and a substance capable of dissolving or dispersing said recording material and which is supplied to the recording solution heating unit and made into droplets there by heating so that the droplets are transferred to the recording medium placed opposite to the recording solution heating unit, characterized in that said recording material is a dye which vaporizes more than 90 wt % upon heating at a temperature above 300° C., leaving residues in an amount less than 10 wt %, and said substance is a solvent having a boiling point higher than 150° C. which dissolves or disperses the dye more than 5 wt % at a temperature below 50° C., the dye being selected from the group consisting of a disperse dye and a solvent dye, the solvent being selected from the group consisting of an aromatic ester and an aromatic hydrocarbon.

17. A recording solution as defined in claim 16, wherein said recording solution is composed of a dye and a solvent dissolving more than 5 wt % of said dye at temperatures below 50° C., said dye having a solubility parameter in the range of 7.5 to 10.5 at 25° C. and a molecular weight lower than 550 and containing less than 0.1 wt % of non-volatilizable residue which remains when heated at 200° C. in the air, said solvent being colorless and having a solubility parameter in the range of 7.5 to 10.5 at 25° C., a molecular weight lower than 450, a melting point lower than 50° C., a boiling point in the range of 250° C. to 400° C., and containing less than 0.01 wt % of non-volatilizable residue which remains when heated at 200° C. in the air.

18. A recording solution as defined in claim 17, wherein said aromatic ester is dialkyl phthalate.

19. A recording solution as defined in claim 17, wherein said aromatic hydrocarbon is n-alkylbenzene.

20. An improved recording method including the steps of feeding a recording solution to a recording solution heating unit, heating the recording solution to change its state, making the recording solution into droplets, and transferring the droplets to a recording medium placed opposite to the recording solution heating unit, said recording solution being composed of a recording material and a substance which dissolves or disperses the recording material therein, characterized in that said recording solution heating unit has a porous structure formed on a horizontal surface thereof, said porous structure being composed of a plurality of parallel upwardly protruding structures, the upwardly protruding structures each comprising an elongated horizontal cross section having a width ranging from 0.2 to 3 µm and a length ranging from 0.5 to 3 µm, the width being shorter than the length, the upwardly protruding members being spaced apart from one another by a distance ranging from about 0.5 to 3 µm and having a height ranging from 2 to 10 µm, the upwardly protruding members being arranged in arrays of three or more rows and three or more columns, and that said recording solution is composed of a dye which vaporizes more than 90 wt % upon heating at a temperature above 300° C., leaving residues in an amount less than 10 wt %, and dialkyl ester phthalate (as a solvent) having a boiling point higher than 150° C. which dissolves or disperses the dye more than 5 wt % at a temperature below 50° C.

* * * * *